United States Patent
Chadwick et al.

(10) Patent No.: US 6,600,896 B2
(45) Date of Patent: Jul. 29, 2003

(54) EXCITER SYSTEM AND EXCITATION METHODS FOR COMMUNICATIONS WITHIN AND VERY NEAR TO VEHICLES

(75) Inventors: George G. Chadwick, Los Altos Hills, CA (US); Robert W. Haight, La Honda, CA (US); Edward Collins, IV, Royal Oaks, CA (US)

(73) Assignee: Cocomo MB Communications, Inc., Tokyo (JP)

( * ) Notice: Subject to any disclaimer, the term of this patent is extended or adjusted under 35 U.S.C. 154(b) by 0 days.

(21) Appl. No.: 10/160,747

(22) Filed: May 30, 2002

(65) Prior Publication Data

US 2002/0142716 A1 Oct. 3, 2002

Related U.S. Application Data

(63) Continuation-in-part of application No. 09/909,247, filed on Jul. 19, 2001, and a continuation-in-part of application No. 09/909,246, filed on Jul. 19, 2001, and a continuation-in-part of application No. 09/724,544, filed on Nov. 27, 2000, and a continuation-in-part of application No. 09/340,218, filed on Jun. 25, 1999.

(51) Int. Cl.[7] ................................................ H04H 1/00
(52) U.S. Cl. ...................... 455/3.01; 455/99; 455/575
(58) Field of Search ............................. 455/3.01, 3.05, 455/414, 461, 462, 463, 11.1, 557, 575, 99, 345

(56) References Cited

U.S. PATENT DOCUMENTS

| | | | |
|---|---|---|---|
| 4,428,078 A | 1/1984 | Kuo | |
| 4,847,561 A | 7/1989 | Soohoo | |
| 5,302,960 A | 4/1994 | Boers | |
| 5,994,984 A | 11/1999 | Stancil et al. | |

FOREIGN PATENT DOCUMENTS

WO    WO 01/01516 A1    1/2001

Primary Examiner—Thanh Cong Le
Assistant Examiner—Thuan T. Nguyen
(74) Attorney, Agent, or Firm—Raymond E. Robert; Michael J. Hughes; IPLO Intellectual Property Law Offices

(57) ABSTRACT

An exciter system (1, 2) able to communicate information between an exciter unit (10) and one or more remote units (12) or between multiple exciter units (10). The exciter units (10) may include wireless type exciter devices, such as optimum exciters (14), or they may include wired equivalent type exciter devices, such as direct connect exciters (16). The exciter devices (14, 16) inject or extract RF currents (24) in the metallic framework (22) of a vehicle. The remote units (12) couple electromagnetic fields (26) with the metallic framework (22) of the vehicle. The information is exchanged with the exciter devices (14, 16) by communications equipment (20) that modulates or demodulates the RF currents (24) and/or electromagnetic fields (26) with the information. As the RF currents (24) and/or electromagnetic fields (26) reach everywhere within, on and in close proximity to the vehicle the information is communicated throughout.

20 Claims, 18 Drawing Sheets

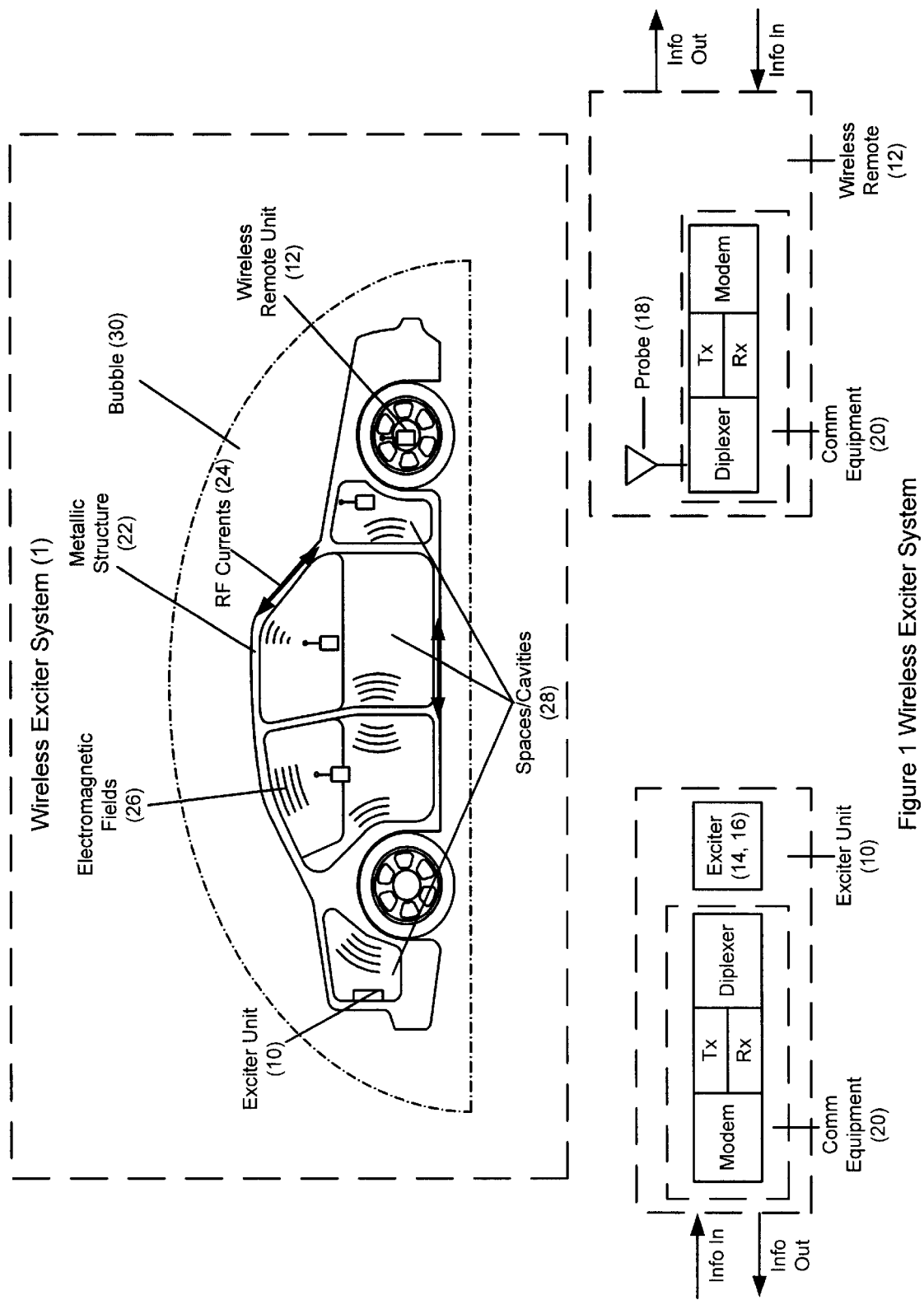
Figure 1 Wireless Exciter System

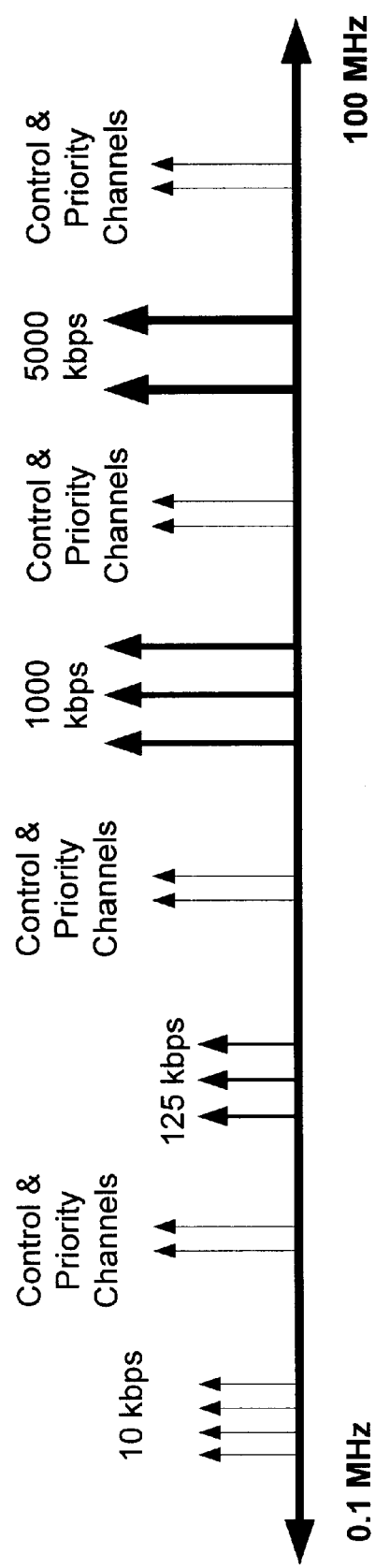

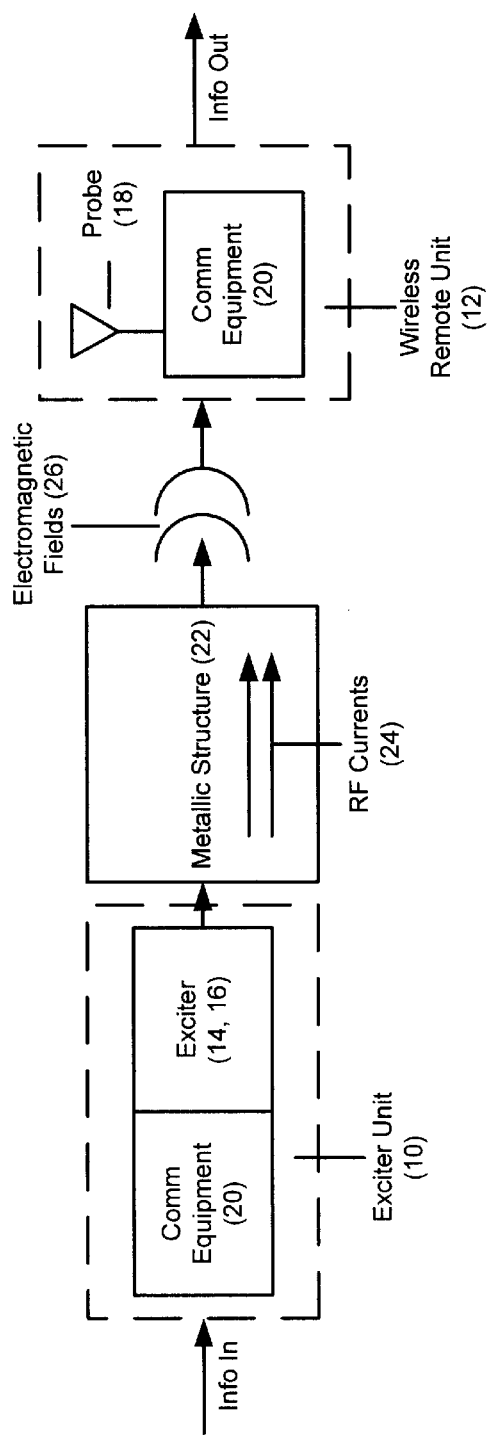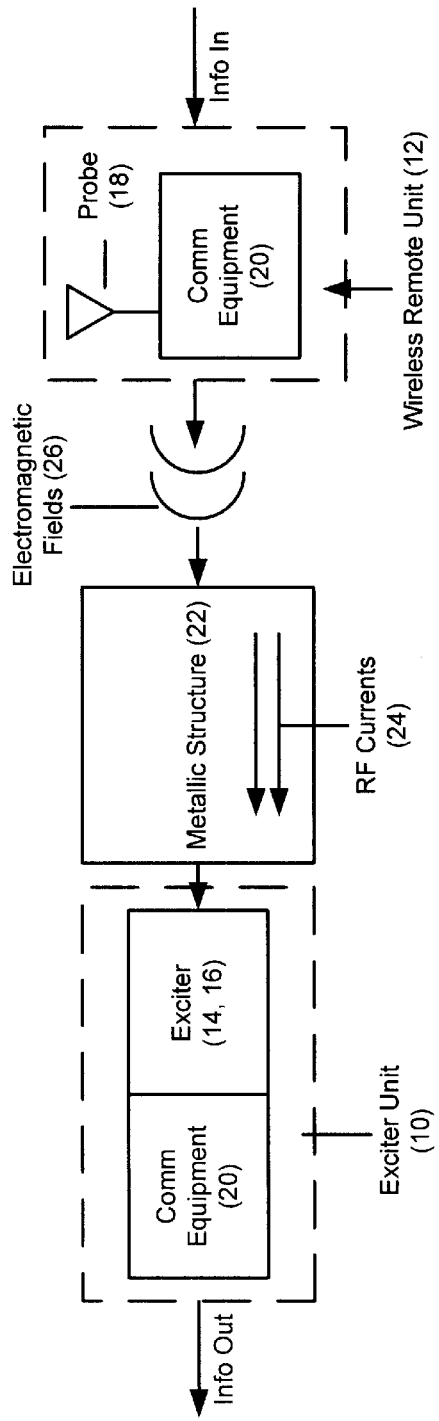
Figure 3A One Way Wireless Communication Links in Vehicles, Exciter to Remote
Figure 3B One Way Wireless Communications Links in Vehicles, Remote to Exciter

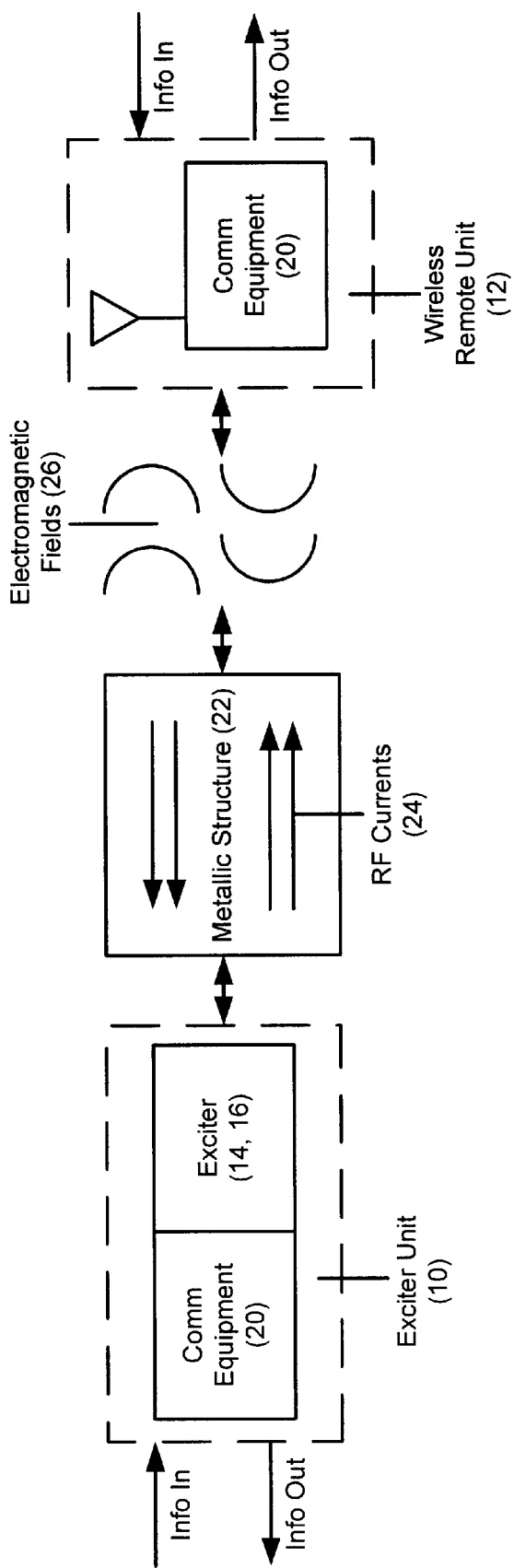
Figure 4 Two Way Wireless Communication Links in Vehicles

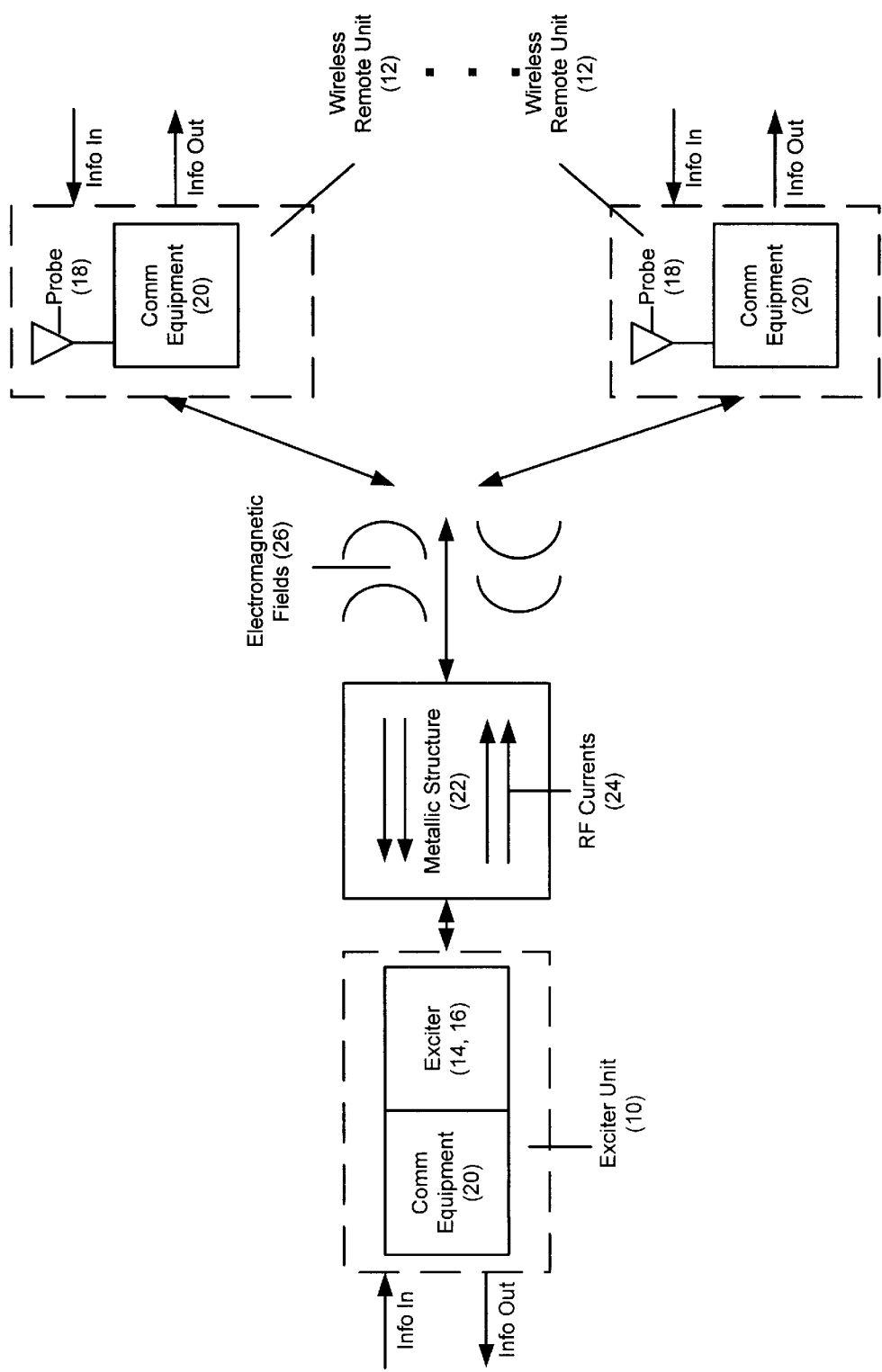
Figure 5 Network Wireless Communication Links in Vehicles

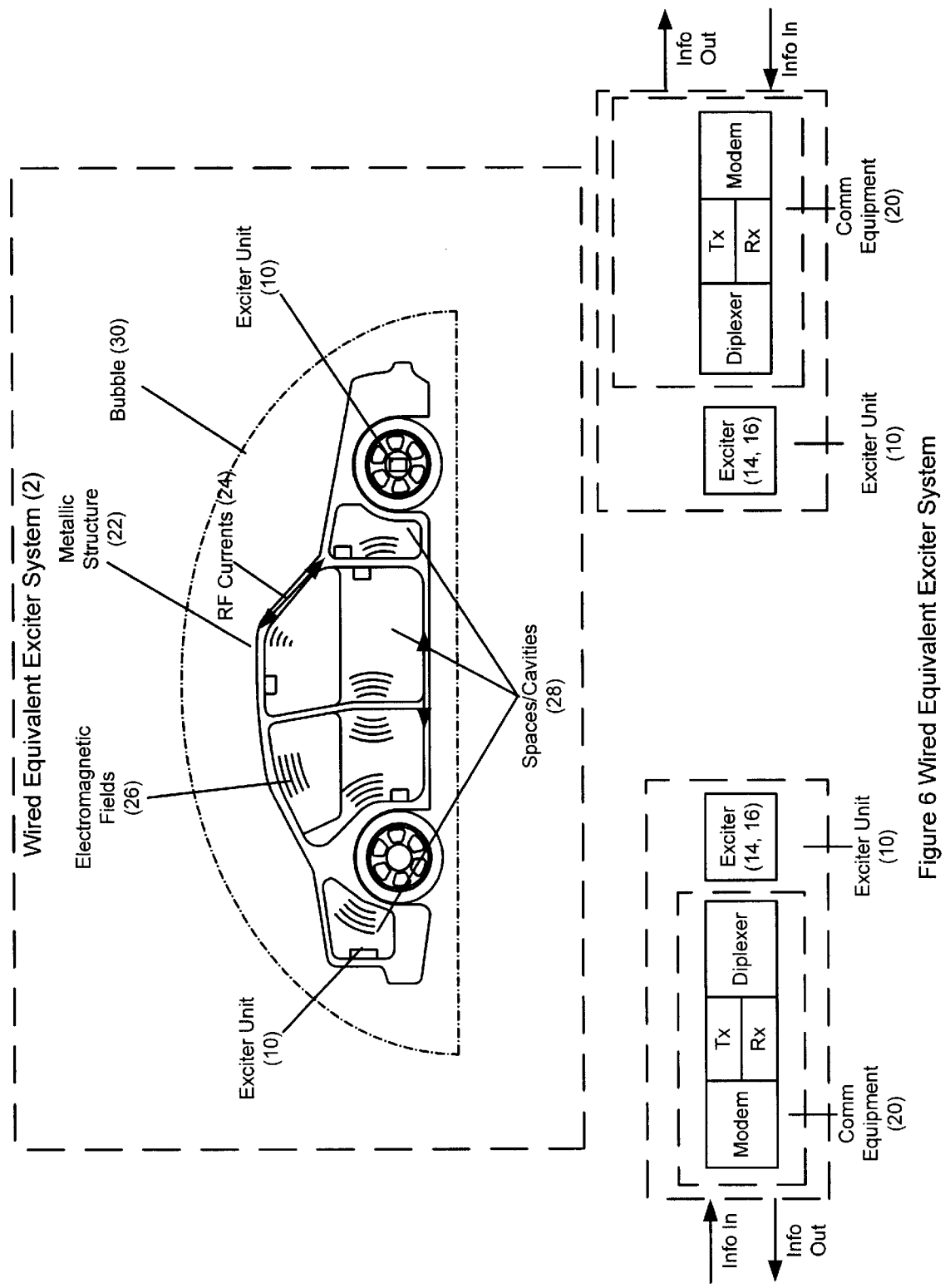
Figure 6 Wired Equivalent Exciter System

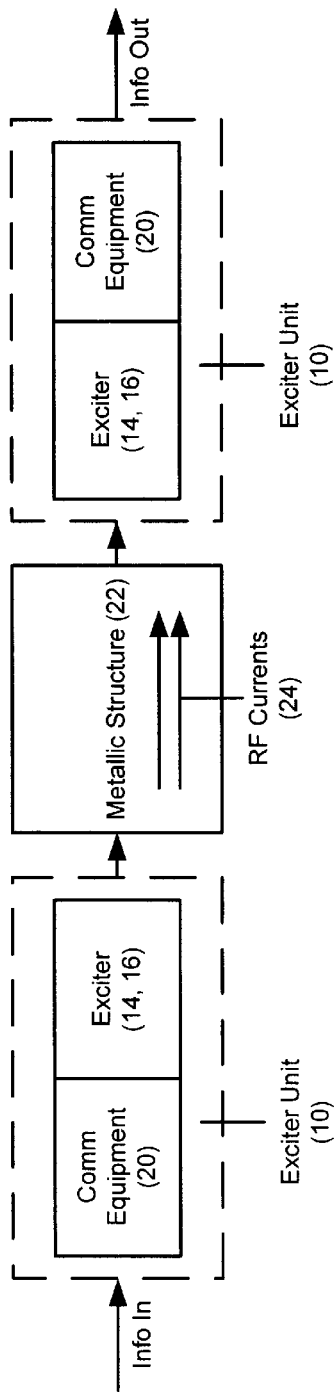
Figure 7A One Way Wired Equivalent Communication Links in Vehicles, Exciter to Remote
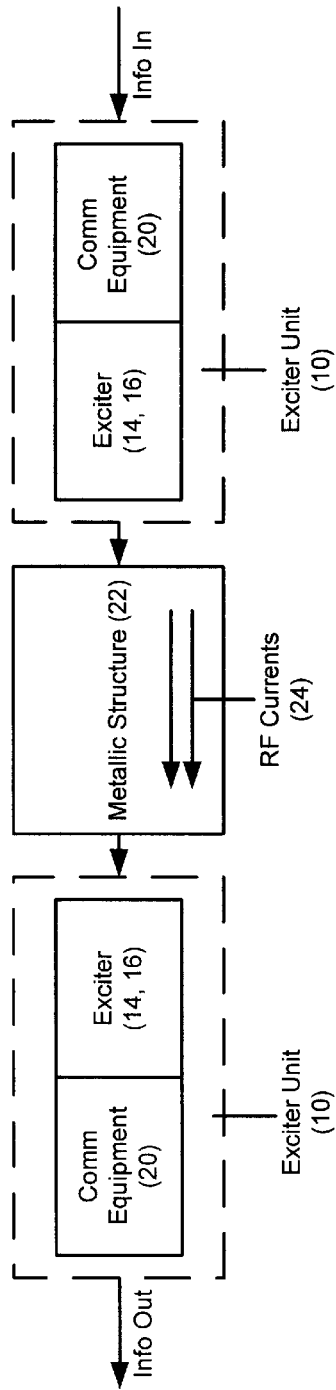
Figure 7B One Way Wired Equivalent Communications Links in Vehicles, Remote to Exciter

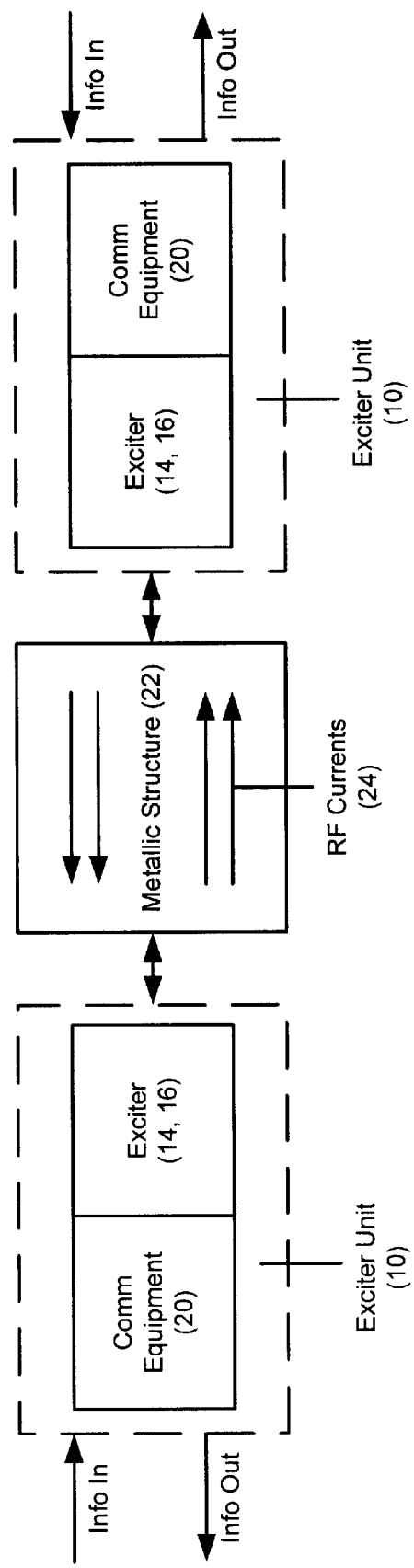
Figure 8 Two Way Wired Equivalent Communication Links in Vehicles

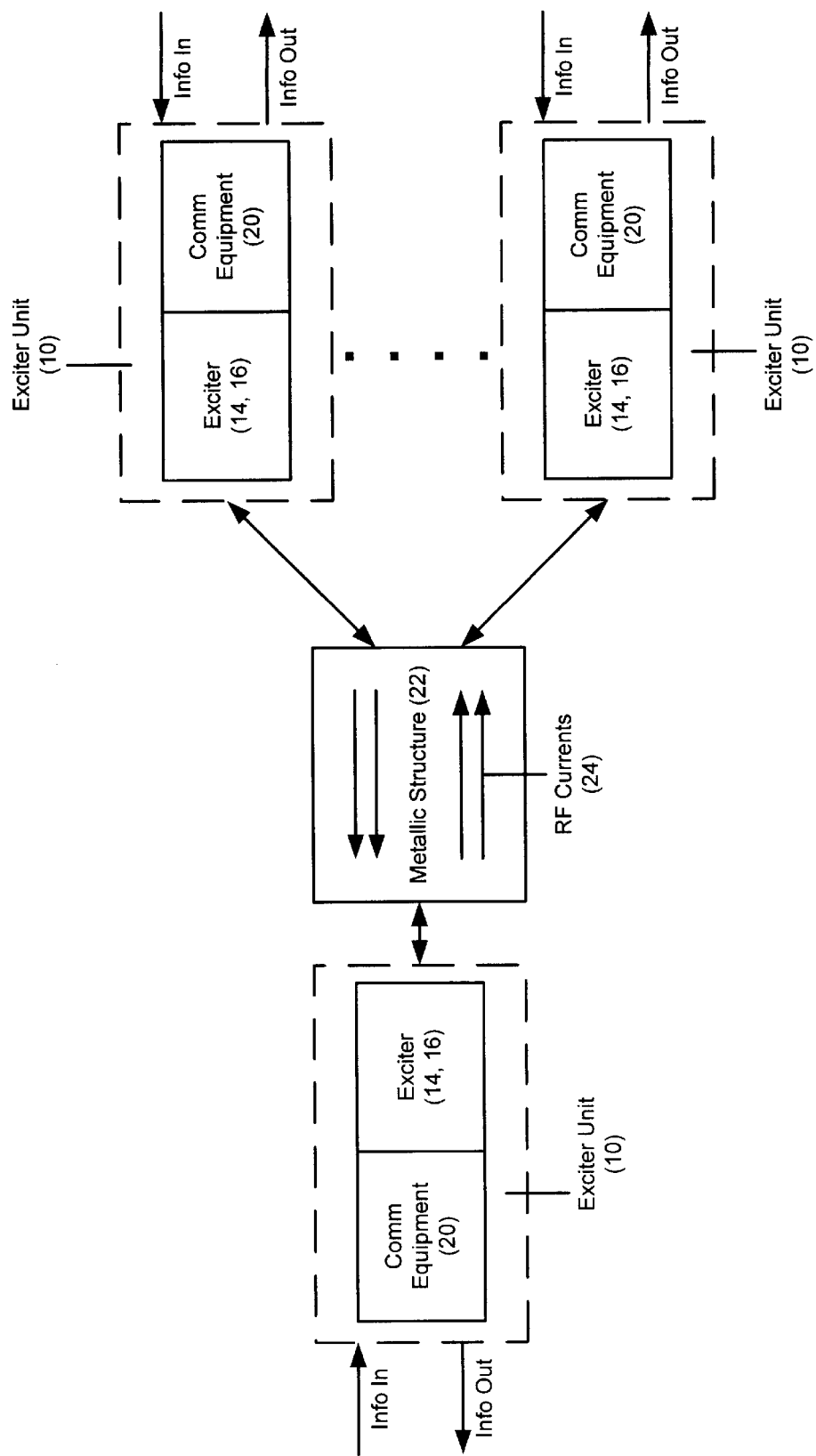
Figure 9 Network Wired Equivalent Communication Links in Vehicles

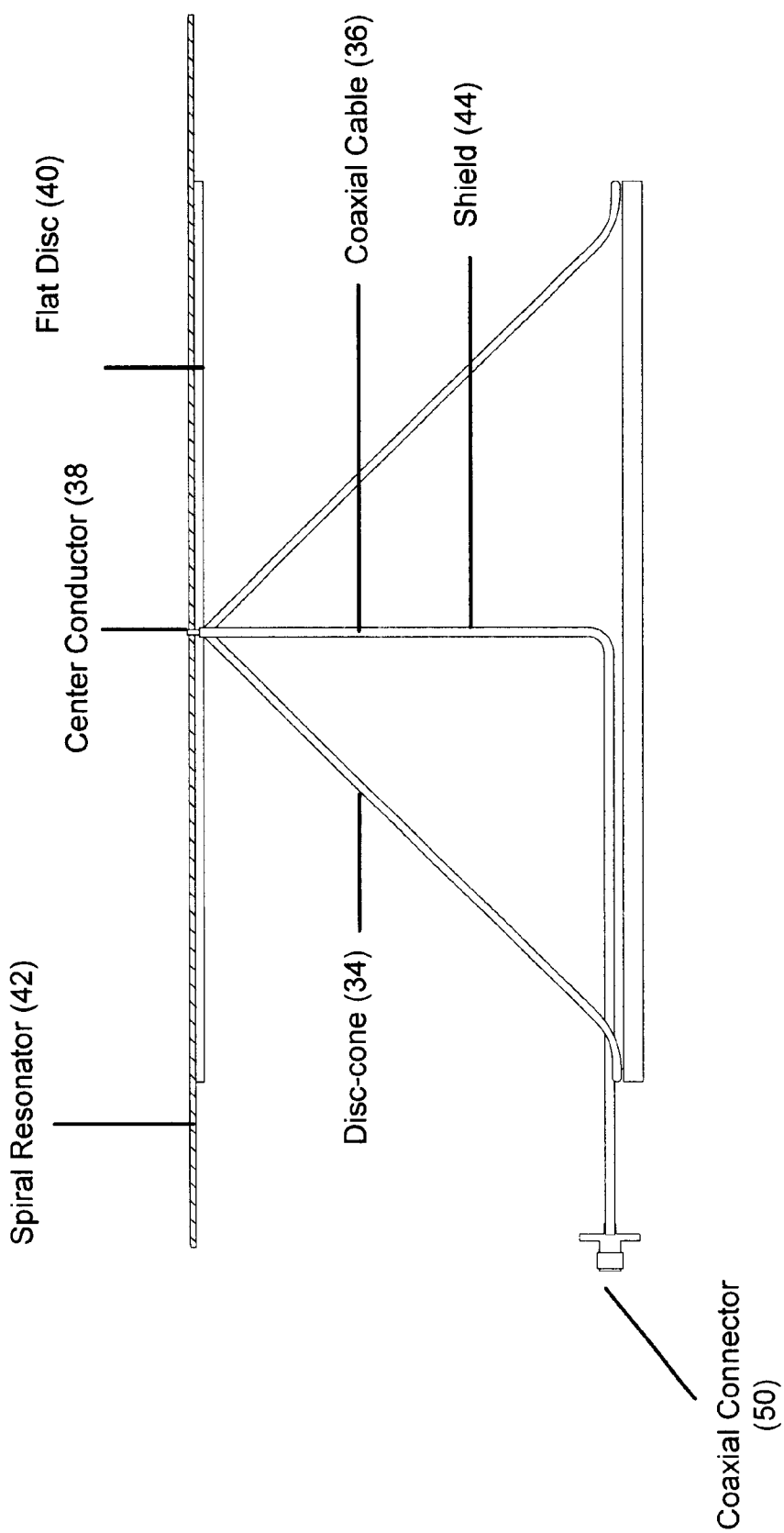
Figure 10 Disc-cone Exciter

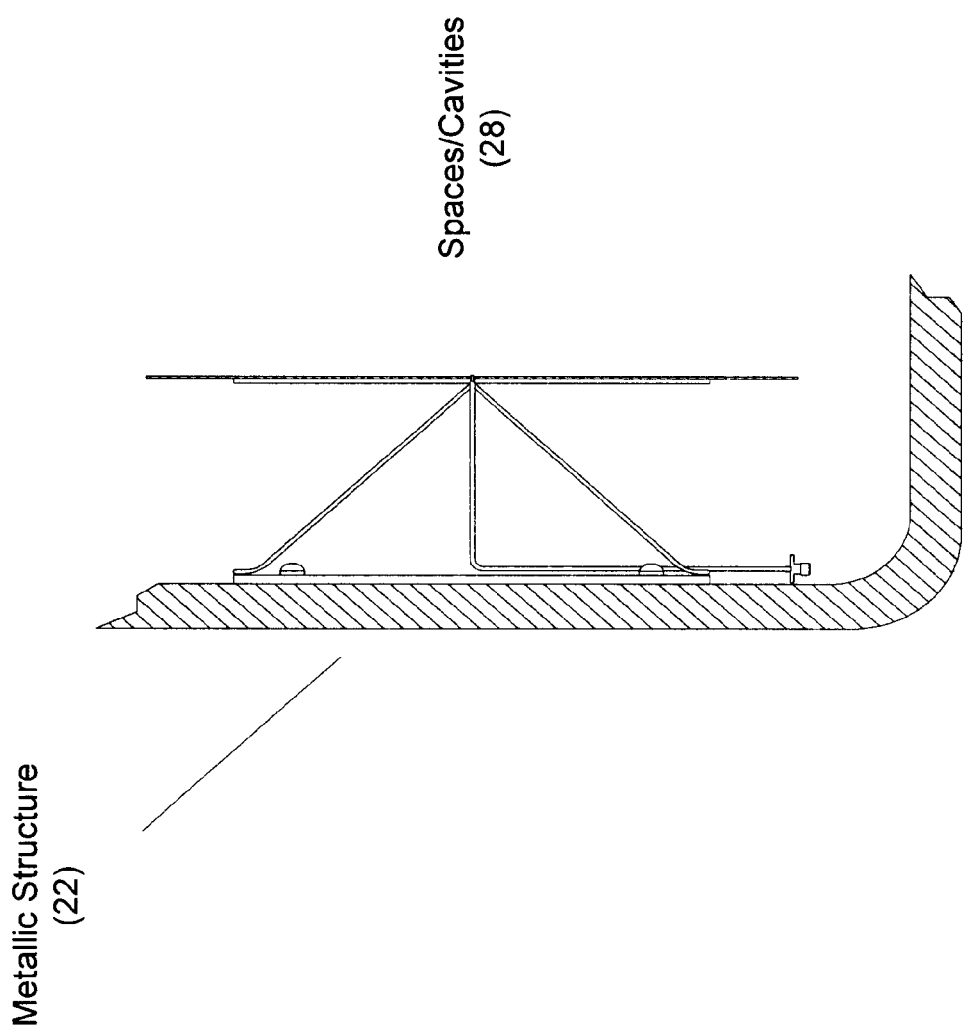
Figure 11 View of Disc-cone Exciter as Installed in a Vehicle

Figure 14 Generic Direct-Connect Exciter

Figure 16 View of Disc-cone Exciter as Installed in a Vehicle

EXCITER SYSTEM AND EXCITATION METHODS FOR COMMUNICATIONS WITHIN AND VERY NEAR TO VEHICLES

CROSS-REFERENCE TO RELATED APPLICATIONS

This is a continuation-in-part of U.S. application Ser. No. 09/909,247, filed Jul. 19, 2001; U.S. application Ser. No. 09/909,246, filed Jul. 19, 2001; U.S. application Ser. No. 09/724,544, filed Nov. 27, 2000; and U.S. application Ser. No. 09/340,218, filed Jun. 25, 1999.

TECHNICAL FIELD

The present invention relates generally to communications, and more particularly to systems for communications internally and in close proximity to vehicles having metallic structures. The invention is particularly useful at radio frequencies in the range of 0.1 to 100 MHz, with some variants of the invention able to operate at ranges above 500 MHz.

BACKGROUND ART

It is desirable to communicate information between various locations within and around vehicles, including but not limited to cars, trucks and tractor-trailers, trains, ships and planes. Traditionally, this has been obtained by installing conductive wires between points. More recently, optical cable has somewhat similarly been employed in this role. Traditional wireless technologies in the 2.4 and 5 GHz frequency bands are also used.

Unfortunately all of these prior art systems have disadvantages. Wire and optical cable consume appreciable material and require routing between the various locations using the information, often entailing considerable design complexity. The conventional wireless technologies also often entail considerable design complexity, both to ensure that the integrity of the information is maintained against corrupting influence from outside the vehicle as well as to ensure that the energy being used to communicate the information does not become a corrupting influence on other systems.

These concerns are exacerbated in the context of vehicles. Firstly, a vehicle has particular structure. It has compartments, that is, spaces or cavities. These include large compartments, which are here termed "major compartments." For example and without limitation, in a common automobile the major compartments are the engine or underhood compartment, the passenger compartment, and the trunk or boot. In a common freight-hauling truck the major compartments are the engine compartment, driver/passenger compartment, and the cargo area. In common vehicles the glove box or other interior storage areas, for instance, are not major compartments. As a generalization, physical access to the major compartments of a vehicle is usually available. In contrast, physical access to the other compartments of a vehicle often is problematical.

Secondly, a vehicle is mobile by its very nature. Its systems therefore have the ability to be corruptingly influenced or to become a corrupting influence in highly varying and very difficult to predict manners. For an example, consider the traditional wireless technologies in the 2.4 or 5 GHz frequency bands. If a vehicle employing these is brought near sensitive electronic equipment it may cause disruption of that equipment. Conversely, the very same vehicle may itself be severely disrupted if brought near high powered electronic equipment. These concerns complicate information communication within (which we will regard here as including attached to the outside of) and in close proximity to vehicles.

Accordingly, what is needed are better systems for communications within and near to vehicles. Such systems should preferably have the capability for a single transmission to reach all of the vehicle compartments, as well as the near proximity outside the vehicle, without the use of repeaters or multiple physical access points.

DISCLOSURE OF INVENTION

Accordingly, it is an object of the present invention to provide an exciter system and excitation methods for communications within and very near to vehicles.

Briefly, one preferred embodiment of the present invention is a system for communicating information between a first location within a vehicle and a second location either within or very near to the vehicle. The vehicle has a conductive metallic structure defining one or more major compartments. An exciter unit is provided that includes a first communication equipment and an exciter device that is conductively connected to the metallic structure of the vehicle. A remote unit is also provided that includes a second communication equipment having a probe that is not conductively connected to the metallic structure of the vehicle. The first communication equipment may accept the information at the first location and modulate a signal with it. The signal has a carrier frequency that exhibits cut-off at one half-wavelength, as defined by the smallest dimension of the major compartments of the vehicle. Operation at frequencies below cut-off produces evanescent electromagnetic fields. Operation at frequencies above cut-off produces the more conventional propagating electromagnetic fields. The exciter device can then receive the signal from the first communication equipment and conductively inject it as a current into the metallic structure of the vehicle such that an electromagnetic field is produced. The second communication equipment then is able to couplingly receive the electromagnetic field from the metallic structure of the vehicle via the probe, demodulate the information from the electromagnetic field, and provide the information at the second location. The second communication equipment also may accept the information at the second location, modulate the electromagnetic field with it, and couplingly transmit the electromagnetic field into the metallic structure of the vehicle via the probe, such that the current is generated there in. The exciter device then may conductively extract the signal, as the current, from the metallic structure of the vehicle and provide it to the first communication equipment. The first communication equipment is then able to demodulate the information from the signal and provide it at the first location. This accordingly provides the ability to communicate the information between the first location and the second location in a wireless manner.

Briefly, another preferred embodiment of the present invention is a system for communicating information between at least two locations within a vehicle. The vehicle has a conductive metallic structure defining one or more major compartments. A number of exciter units are provided, equaling the number of the locations and each including a communication equipment and an exciter device that is conductively connected to the metallic structure of the vehicle. The communication equipment may each accept the information at its respective location and modulate a signal with it, wherein the signal alternates at a radio frequency.

The exciter devices may then receive the signal from their respective communication equipment and conductively inject it as a current into the metallic structure of the vehicle. The exciter devices may each also conductively extract the current from the metallic structure of the vehicle, obtain the signal from the current, and provide the signal to its respective communication equipment. The communication equipment may then demodulate the information from the signal and provide it at its respective location. This accordingly provides the ability to communicate the information between the locations in a wired equivalent manner.

An advantage of the present invention for wireless vehicle communications is that the dimensions of vehicles, particularly for the major compartments within a vehicle, are generally small with respect to the radio frequency (RF) wavelengths for proposed operations. This results in reduced transmission path losses thereby reducing the communications transmitter power required. Another aspect of the small vehicle interior dimensions with respect to operating wavelengths is that the dominant electromagnetic field within the vehicle will be evanescent fields generated by the exciter injected RF currents in the vehicle's metallic structure. Evanescent fields do not propagate and thereby do not introduce blockage or multipath effects within the vehicle, effects common to conventional propagation systems.

Another advantage of the invention for wireless vehicle communications is that at frequencies above cutoff, where cutoff occurs when the wavelength equals ½ the smallest dimension of the major compartments of the vehicle, the invention continues to inject currents in the structure and also supports more conventional electromagnetic waves fields that may also be used for wireless communications.

Another advantage of the invention for wireless vehicle communications is that the RF currents flow to all the interconnected metallic structures of the vehicle. These currents then cause electromagnetic fields in all compartments of the vehicle, particularly including the major compartments, thereby enabling wireless communications between the exciter and remote devices and probes located within these compartments.

Another advantage of the invention for wireless vehicle communications is that the electromagnetic field leakage to the near proximity of the outer surfaces of the vehicle enables communications between the exciter and remote devices and probes located near the external surface of the vehicle.

Another advantage of the invention for wireless vehicle communications is that the exciter has sufficient usable, controllable bandwidth that it can be used to establish numerous communications links, data buses or network applications without interference between the various communications applications.

Another advantage of the invention for wireless vehicle communications is that it can provide contiguous bandwidth across a wide range. This can include 0.1 MHz to the cutoff frequency for evanescent fields and additional contiguous bandwidth from the cutoff to and above 100 MHz for propagating waves.

Another advantage of the invention for wireless vehicle communications is that it uses the size of a vehicle structure to eliminate the need for very large antennas.

And another advantage of the invention for wireless vehicle communications is that low power remote unit "probes" can be used to couple with the conductive framework of the vehicle in order to transmit signals back to the exciter, with the unique relationship of the exciter system to the conductive framework allowing reception of such weak signals.

An advantage of the invention for wired equivalent vehicle communications is that the dimensions of vehicles are generally small with respect to the RF wavelengths for proposed operations. This results in reduced transmission path losses thereby reducing the communications transmitter power required.

Another advantage of the invention for wired equivalent vehicle communications is that the RF currents flow to all the interconnected metallic structures of the vehicle. These currents can then be received at any point in or on the vehicle metallic structure thereby enabling communications between exciters at points on the inside and outside of the metallic structure of the vehicle.

Another advantage of the invention for wired equivalent vehicle communications is that communications between exciters within or on a vehicle, utilizing the metallic structure of the vehicle, reduces the level of interference from external sources or by internal interference sources of the vehicle such as the ignition, electric window operation or other electrical interference sources. This is accomplished because all antenna-like elements and wires are eliminated in a wired equivalent communication application and the invention need only operate in the reduced environment of return ground currents in the very low impedance of the metallic structure.

And another advantage of the invention for wired equivalent vehicle communications is that it can provide contiguous bandwidth from 0.1 MHz to greater than 100 MHz. Furthermore, the directly connected exciters can inject currents in the vehicle metallic structure at frequencies to and above 500 MHz and thereby establish propagating electromagnetic fields external to the vehicle. This feature permits communications links to and from the vehicle in frequency bands where regulatory allocations for specific applications currently exist. Examples are the 315 and 433 MHz bands for vehicle remote keyless entry and garage door openers.

An advantage of the invention for both wireless and wired equivalent vehicle communications is that the exciter has sufficient usable, controllable bandwidth that it can be used to establish numerous communications link, data bus or network applications without interference between the various communications applications.

Another advantage of the invention for both wireless and wired equivalent vehicle communications is that the exciter component can serve multiple functions and eliminate the need for separate antenna-like components.

And another advantage of the invention for both wireless and wired equivalent vehicle communications is that the exciter component is physically compact in structure and can be installed and become operational very quickly.

These and other objects and advantages of the present invention will become clear to those skilled in the art in view of the description of the best presently known mode of carrying out the invention and the industrial applicability of the preferred embodiment as described herein and as illustrated in the several figures of the drawings.

BRIEF DESCRIPTION OF THE DRAWINGS

The purposes and advantages of the present invention will be apparent from the following detailed description in conjunction with the appended figures of drawings in which:

FIG. 1 is a schematic and block diagram representation of an exciter system for wireless communication according to the present invention;

FIG. 2 is a graph depicting one possible allocation of frequency spectrum for use of the embodiment of the invention in FIG. 1;

FIGS. 3A–B are block diagrams representing possible one-way communications scenarios utilizing the embodiment in FIG. 1, wherein FIG. 3A depicts communications from an exciter to a probe equipped portions of the embodiment in FIG. 1 and FIG. 3B depicts communications from the probe to the exciter equipped portions of the embodiment in FIG. 1;

FIG. 4 is a block diagram depicting two-way communications between an exciter equipped and a probe equipped portions of the embodiment in FIG. 1;

FIG. 5 is a block diagram depicting network communications between an exciter and a plurality of probe equipped portions of the embodiment in FIG. 1;

FIG. 6 is a schematic and block diagram representation of an exciter system for wired equivalent communication according to the present invention;

FIGS. 7A–B are block diagrams representing possible one-way communications scenarios utilizing the embodiment of the invention in FIG. 6, wherein FIG. 7A depicts communications from a first exciter to a second exciter and FIG. 7B depicts communications from the second exciter to the first exciter;

FIG. 8 is a block diagram depicting two-way communications between two exciter equipped portions of the embodiment in FIG. 6;

FIG. 9 is a block diagram depicting network communications between a plurality of exciter equipped portions of the embodiment in FIG. 6;

FIG. 10 is a side cross-section view of a disc-cone type exciter, as might be used in the embodiment of the invention in FIG. 1;

FIG. 11 is partial view, also in side cross-section, of the disc-cone type exciter of FIG. 10 installed in a vehicle;

In the various figures of the drawings, like references are used to denote like or similar elements or steps.

BEST MODE FOR CARRYING OUT THE INVENTION

Figure 12:
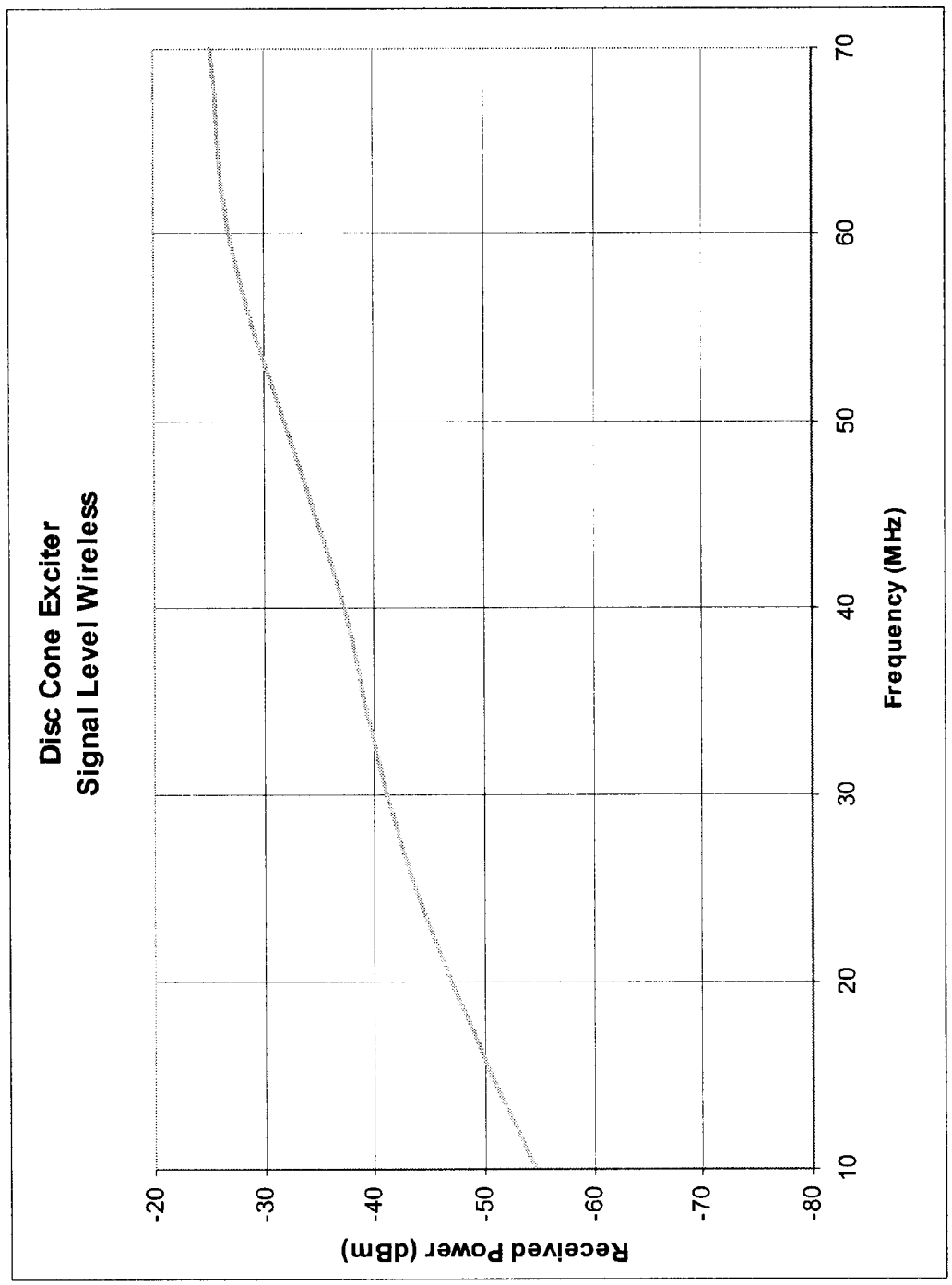
FIG. 12 is a graph of measured results obtained in a vehicle with the disc-cone type exciter installed and operational in wireless communication mode, as might be used in the embodiment of the invention in FIG. 1.

Preferred embodiments of the present invention are an exciter system and excitation methods for communications within and very near to vehicles. As illustrated in the various drawings herein, and particularly in the views of FIGS. 1 and 6, preferred embodiments of the invention are depicted by the general reference characters 1 and 2.

The present invention is an extension of those taught in U.S. application Ser. No. 09/909,247, filed Jul. 19, 2001; U.S. application Ser. No. 09/909,246, filed Jul. 19, 2001; U.S. application Ser. No. 09/724,544, filed Nov. 27, 2000; and U.S. application Ser. No. 09/340,218, filed Jun. 25, 1999, all by the present inventor and all hereby incorporated by reference here in their respective entireties.

The presently preferred embodiments use exciter devices in an overall system to facilitate and optimize wireless and wired equivalent communications within and around vehicles, including but not limited to cars, trucks and tractor-trailers, trains, ships and planes. Briefly, the invention operates by injecting currents in the metallic structure of a vehicle wherein electromagnetic fields are created in the compartments of the vehicle as well as near the outer surface of the vehicle. The current invention may be applied to vehicles in two manners, to accomplish wireless communications and also wired equivalent communications.

The term "wired equivalent communications" is one coined by the inventor to denote a methodology wherein communications from one point on a vehicle structure to another point or to multiple points on the vehicle structure occurs via currents within the vehicle structure as caused by exciters at each end. These communications have all the bandwidth and connectivity capabilities of wired communications, but the vehicle's metallic structure replaces the wires, thus the term wired equivalent communications.

The invention employs an exciter that can take two forms. One form, termed an "optimum exciter" by the inventor, injects and/or receives currents from the vehicle structure in a manner that enables broadband, efficient wireless communications performance from the lowest frequencies to the highest frequencies in the operating band of the invention. A second form is a directly connected exciter which is much simpler, but with less efficient performance at low frequencies. FIG. 1 illustrates the overall operation of wireless communications including an optimum exciter system 1 in a typical vehicle. FIG. 6 illustrates the overall operation of the wired equivalent communications including a direct connect exciter system 2 in a typical vehicle.

Either type of exciter, in conjunction with one or more remote units with probes and communications equipment such as modems, transmitters, receivers and filters may be used to create a wireless communications link, links or network within the vehicle. One-way, two-way or networked wireless or wired equivalent communications throughout the vehicle can be provided without the traditional wiring harnesses common to today's vehicles.

FIG. 1 depicts wireless communications, wherein the invention employs an exciter that injects currents into the metallic structure of the vehicle and creates electromagnetic fields within and near the vehicle such that communications can be received by one or more remote communications devices with probes. Communications signals can be transmitted from the remote device to the exciter by coupling transmitted energy from the remote device probe to the metallic structure thereby creating (radio frequency) RF currents in the metallic structure of the vehicle that can be received by the exciter.

The exciter system 1, 2 is adapted to operate in an enclosed space 28 (or a partially enclosed one), which may be considered to be either a small space, such as a passenger compartment or as a larger space, as in a commercial vehicle cargo area. The enclosed space 28 of either type must include some variety of conductive structure or framework 22 which can conductively "deliver" the energy placed into the conductive framework 22 throughout the enclosed space 28 to create a quasi-static electromagnetic field 26 throughout the enclosed space 28 at frequencies below cutoff (i.e., an evanescent field). The cutoff frequency is where the smallest dimension of the enclosed space or cavity is equal to ½ the wavelength. Above the cutoff frequency the electromagnetic fields in the space transition to more conventional propagating waves. As previously noted, the term "major compartment" is also used herein to refer to suitable enclosed spaces.

The conductive framework 22 may be a single path, a convoluted path or a variety of conductive elements, all of which acting together form an electromagnetic virtual volume, akin to a "Faraday cage" which the inventor terms the "bubble," or herein bubble 30. Typically, the conductive framework 22 is formed of the vehicle metallic frame, electrical ground wiring, and combinations of these elements.

The nature of the bubble 30 is roughly analogous to that of a cage or mesh that restrains electromagnetic fields much as a cage would restrain physical structures that are too large to fit between the bars. In this case, the conductive framework 22 forms virtual bars for fields with gaps existing where no elements of the framework 22 are present. As long as the gaps in the conductive framework 22 are smaller than one-half wavelength of the operating frequency the electromagnetic fields 26 will be "trapped" in the bubble 30 and will have little effect outside the bubble zone. This is especially important for purposes such as sensitive communications and also for compliance with various government regulations, such as FCC restrictions. The bubble 30 may actually include several semi-independent smaller enclosed spaces 28 (e.g., trunk, engine compartment; i.e., the major compartments) each of which may function to some degree as a separate "cage", but that are related by the interconnected conductive framework 22 extending throughout the vehicle.

The element which causes the conductive framework 22 to be energized in such a manner as to create the bubble 30 and provide the basis for wireless or wired equivalent communication, is an exciter 14, 16. The exciter 14, 16 in a particular enclosed space 28 will serve multiple functions. One of the principal functions, and the one from which the component is named, is the function of inducing the RF currents 24 into metallic structure or framework 22 walls. The optimum exciters 14 and the direct connect exciters 16, of the types described herein are schematically shown and described in the inventor's related patent applications as the matching section.

The results obtained in actual vehicle implementations are demonstrable and the system 1, 2 has been shown to function effectively in multiple environments. For the purposes of illustration, the exciter 14, 16 and the exciter system 1, 2 are described herein as exciting the vehicle, thus setting up a non-propagating quasi-static electromagnetic field at any desired frequency up to the cutoff frequency within the range of frequencies, with the non-propagating field acting to provide a "carrier" upon which communications occur. Above the cutoff frequency the fields become the more traditional propagating waves.

In addition, the properties of the exciter 14, 16, when properly installed within a vehicle, create a special coupling with the conductive framework 22 of the vehicle, such that signals induced in the conductive framework 22 at remote locations within the vehicle will be received in sufficient strength to be useful by the exciter component, provided that the signals are also within the frequency range. In this fashion, the same exciter component can function both as an "exciter" and a "listener" (receiver).

Each exciter 14, 16 will be of the same genera but those selected for a particular purpose have many variants in size, materials and packaging. Two specific examples of equally preferred embodiments are shown in the drawings and described herein, but the configuration may vary widely depending on application. A disc-cone exciter 32 is an example of an optimum exciter 14 and is shown particularly in FIGS. 10 and 11 while a direct connect exciter 16 is shown particularly in FIGS. 14, 15 and 16. The disc-cone exciter 32 is preferred for more efficient applications while the smaller direct connect exciter 16 is less efficient but more than adequate for more narrowband applications. The optimum exciter example, the disc-cone exciter 32, has a larger size and surface area in order to provide the more efficient connection which is necessary in order to deliver enough energy at proper frequencies, while the physically smaller direct connect exciter 16 is less efficient but is sufficient to operate in narrowband applications.

The power required to establish communications is related to the signal quality required and proportional to the overall volume of the vehicle, while the most significant dimension to the generation of the evanescent field (a quasi-static electromagnetic field) is the smallest axial distance between opposing conductive surfaces in the vehicle. The local dimensions define the relevant cut-off frequency for the vehicle (and the interior compartments) and are determinative in whether evanescent fields may be established in that compartment when the exciter function is performed. Above the cutoff frequency the exciter will create propagating waves.

For wired equivalent communications, the exciter injects currents in the metallic structure and these currents flow throughout the vehicle's metallic structure. An exciter also has the property of receiving currents in the structure generated by other exciters in or on the vehicle. Two or more exciter systems may therefore communicate with each other at points on the vehicle by injecting in or receiving RF currents from the metallic structure.

This invention provides an equivalent of wired communications medium within or on a vehicle using the metallic structure of the vehicle. This wired equivalent communications is such that similar communications bandwidths, information rates and connectivity may be provided to any point within or on the vehicle metallic structure, just as can be obtained if wires are installed between these points. However, this invention utilizes the metallic structure of the vehicle thereby eliminating the need for wires between communication points.

Either type of exciters, in conjunction with communications equipment such as modems, transmitters, receivers and filter may be used in this fashion to create an equivalent wired communications link, links or network within the vehicle without using traditional wires or transmission lines. In particular, exciters may be used in conjunction with communications equipment to provide one-way, two-way communications or networked communications throughout the vehicle without the traditional wiring harnesses common to today's vehicles.

The structure of a disc-cone exciter 32 is shown in FIGS. 10 and 11, with FIG. 11 illustrating the disc-cone exciter 32 as installed for usage within the trunk of a vehicle. The disc-cone exciter 32 is made up of a disc-cone 34. The disc-cone 34 is formed of four wires that simulate the surface of the disc-cone 34. The input coaxial cable 36 enters through the center of this structure with the center conductor 38 attached to a flat disc 40. The surface of the flat disc 40 serves as a base for a spiral resonator 42. The dimensions of the disc-cone exciter are quite variant with higher efficiency requiring larger size. A typical disc-cone exciter 32 mounted in the trunk of a vehicle has a disc-cone height ranging from two to three inches. The base of the disc-cone 34 and the flat disc 40 ranges from three to four inches in radius. The top loading spiral resonator 42 is typically 12 inches in diameter.

In order to "excite" the vehicle (the conductive framework 22), energy is provided to the disc-cone exciter 32 via a coaxial cable 36 having a center conductor 38 and a shield 44. The center conductor 38 is attached to the disc-cone exciter 32 and the conductive framework 22. As seen in FIG. 10, the shield 44 is directly electrically connected to the conductive framework 22 of the vehicle. The energy delivered by the center conductor 38 does not radiate in normal fashion. The disc-cone's 12-inch diameter spiral resonator 42 is too small to radiate below 100 MHz. However, the structure of the disc-cone exciter 32 represents a significant discontinuity in this frequency range. The energy coupled into the center conductor 38 is almost entirely reflected but the energy that was in the shield 44 is now connected to the conductive framework 22 forming the basis for the evanescent fields. Since the energy injected into the center conductor 38 is returned to the source, the reflected wave represents fifty percent (50%) of the input power. However, this reflected loss is essentially constant with frequency, because the remaining energy is almost totally transferred from the outside shield 44 to the structure of the conductive framework 22. Above the cutoff frequency the exciter will change its dominant mode of operation from non-propagating evanescent fields to propagating waves.

Figure 13:
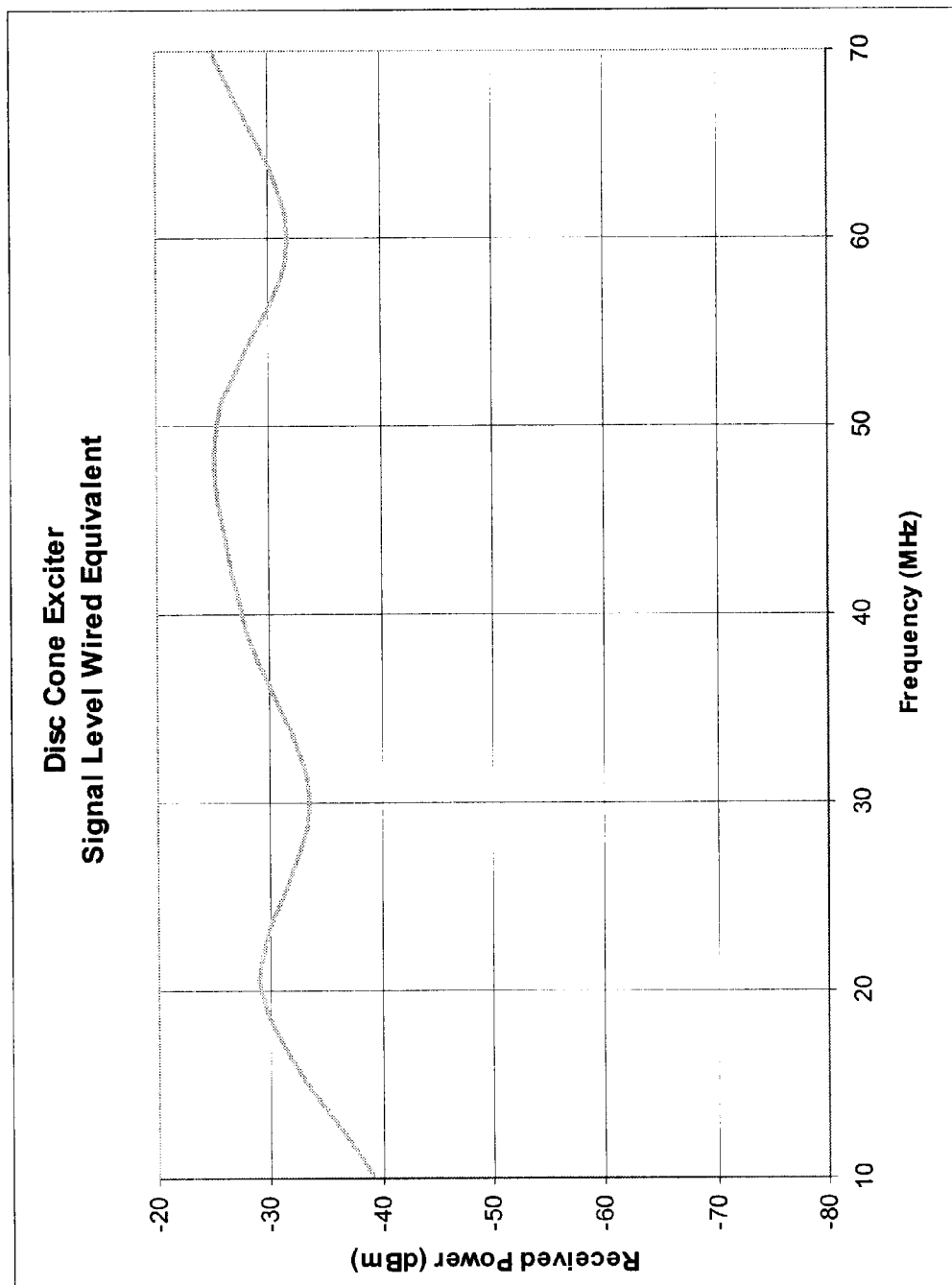
FIG. 13 is a graph of measured results obtained in a vehicle with the disc-cone type exciter installed and operational in wired equivalent communication mode, as might be used in the embodiment of the invention in FIG. 6.

An example of the measured results obtained in a passenger vehicle for a disc-cone exciter with the dimensions given are shown in FIGS. 12 and 13. FIG. 12 shows the measured results applicable to the wireless mode of communications where a 25 dBm signal source was connected to the exciter and the wireless signal in the passenger compartment was measured with a probe. FIG. 13 shows the measured results applicable to the wired equivalent mode of communications where a 25 dBm signal source was connected to the exciter and the signal in the passenger compartment was measured by connecting a second direct connect exciter to a metallic structure within the passenger compartment of the vehicle.

Figure 14:
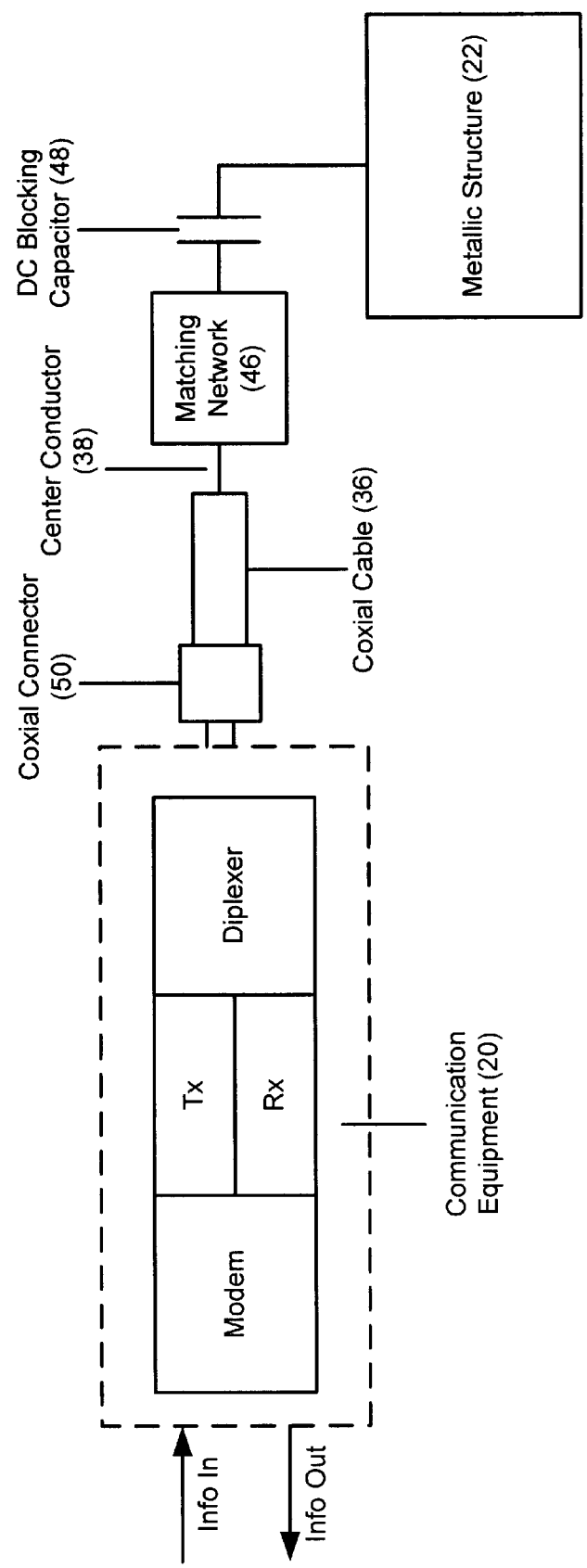
FIG. 14 is a block diagram of a generic direct connect type exciter, as might also be used in the embodiment of the invention in FIG. 6.

The direct connect exciter is an extension of the principles of the optimum exciter where a simplified implementation is desired with a corresponding reduction in efficiency. A generic direct connect exciter 16 is shown in FIG. 14. In this implementation a coaxial cable 36 connects to the exciter system communications equipment 20. The center conductor 38 of this coaxial cable is then connected to a RF matching network 46 and then to a direct current (DC) blocking capacitor 48 which is then connected to the metallic framework 22 of the vehicle.

The direct connect exciter 16 functions in the approximately the same manner as the optimum exciter 14 with respect to injecting and receiving currents in the metallic framework 22. However, the simplicity and small dimensions of the direct connect exciter reduce the achievable efficiency relative to that obtainable with the optimum exciter 14. The RF matching network 46 is designed to provide as efficient energy transfer as possible between the communications equipment 20 and the metallic framework 22 for the frequencies of operation. The function of the DC blocking capacitor 48 in this generic implementation is to isolate the exciter 16 from the DC circuitry of the transmitter and receiver in the communications equipment 20.

Figure 15:
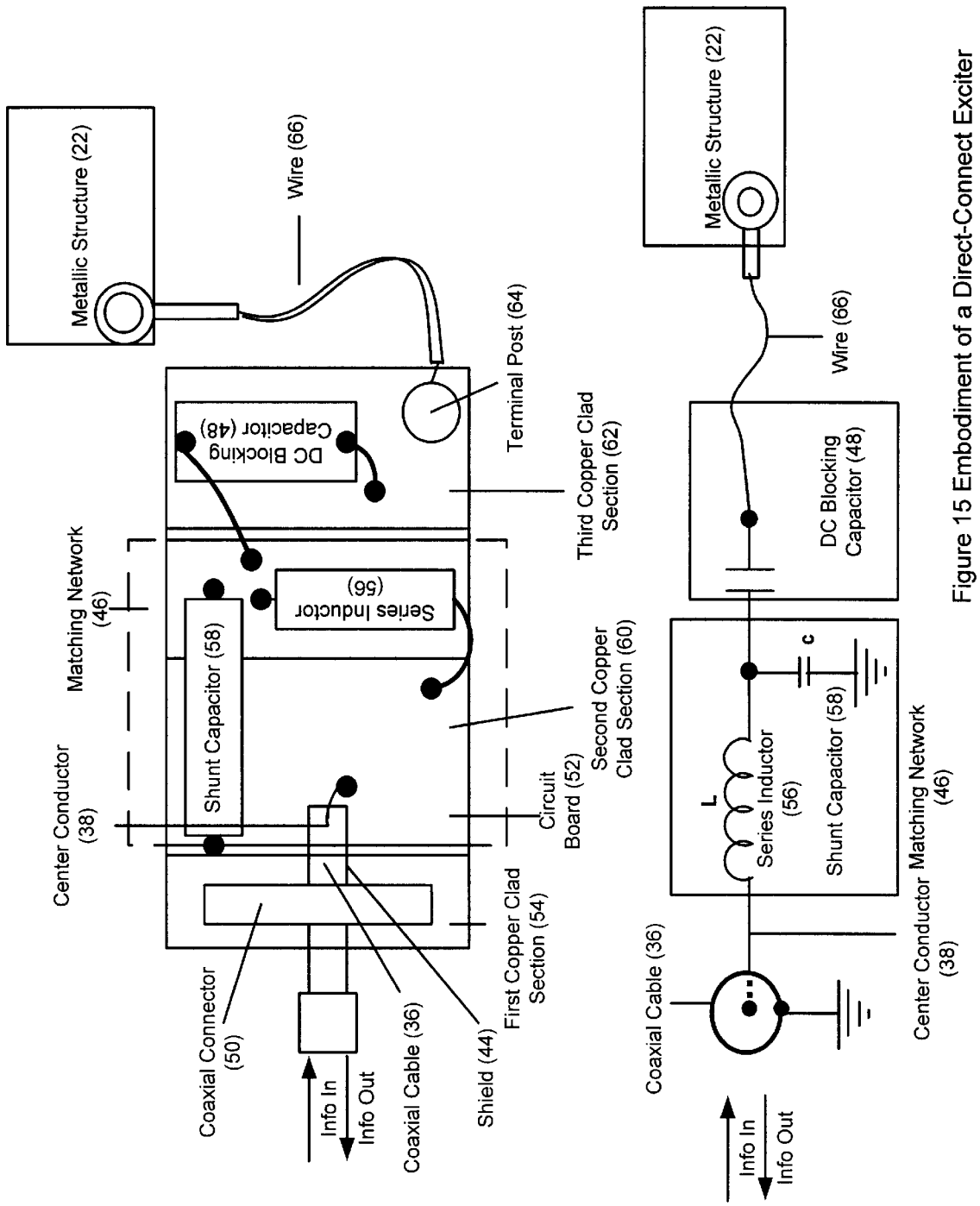
FIG. 15 is a block and schematic diagram of one possible embodiment of the direct connect type exciter in FIG. 14.

FIG. 15 shows one embodiment of a direct connect exciter. In this embodiment a coaxial connector 50 is mounted on a small circuit board 52 with three copper clad sections 54, 60, 62. The coaxial connector 50 is mounted on and connected to the first copper clad section 54. A coaxial cable 36 is then extended from the coaxial connector 50 such that the center conductor 38 is connected to a matching network 46 consisting of a series inductor 56 feeding a shunt capacitor 58 on the second copper clad section 60 and grounded to the first copper clad section 54. The shield 44 is connected on one end of the coaxial connector 50 and is left floating on the other end such that it serves as an RF shield to the center conductor 38 that is connected to the second copper clad section 60.

The series inductor 56 of the matching network 46 is then connected to the DC blocking capacitor 48 on the third copper clad section 62. The DC blocking capacitor 48 is then connected to a terminal post 64. The connection from the direct connect exciter 16 to the metallic structure 22 is then accomplished by connecting a wire 66 between the terminal post 64 and the metallic structure 22.

Figure 16:
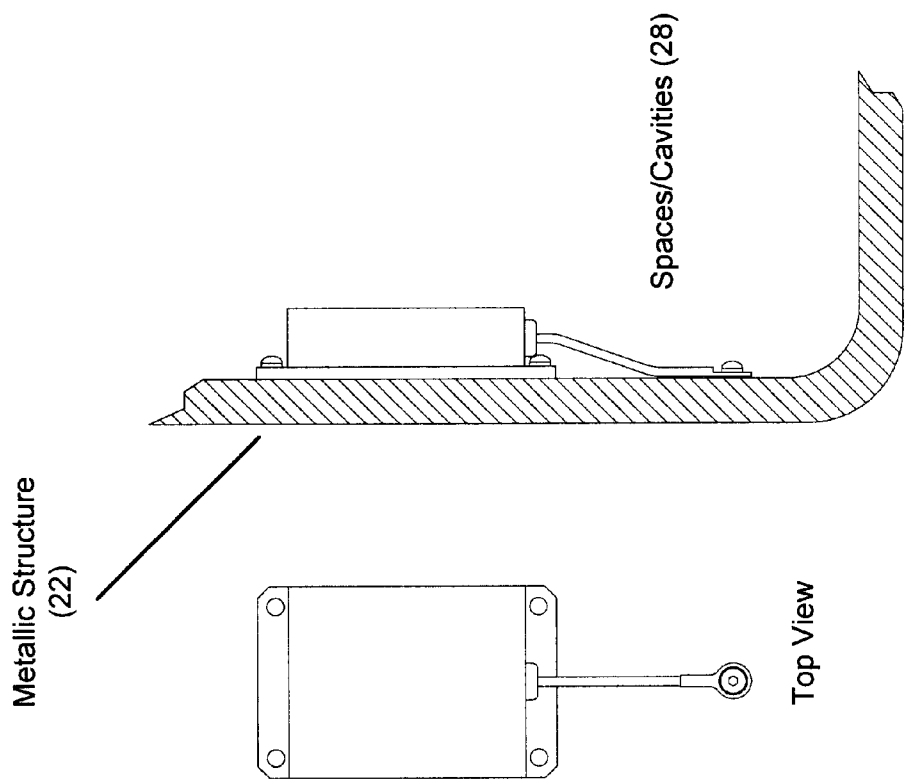
FIG. 16 is a top plan view and also a partial side cross-section view of the direct connect type exciter of FIG. 14 installed in a vehicle.
Figure 17:
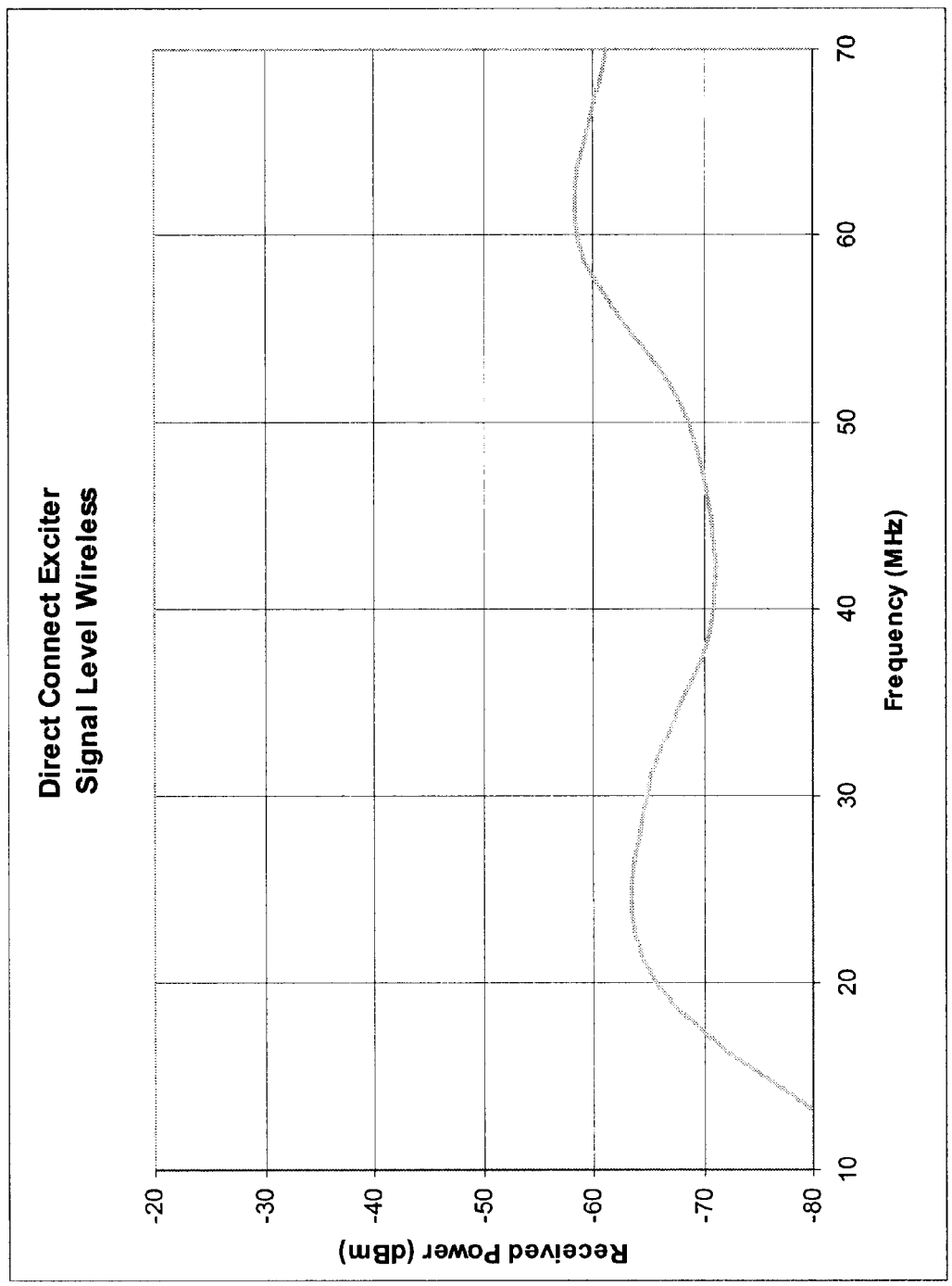
FIG. 17 is a graph of measured results obtained in a vehicle with the direct connect exciter of FIG. 14 installed and operational in wireless communication mode.

FIG. 16 shows a direct connect exciter of FIG. 15 installed in a vehicle. FIG. 17 shows measured data for a wireless link in a passenger vehicle with the direct connect exciter 16 of FIG. 15 installed in the trunk and a wireless remote unit 12 located within the passenger compartment. These measurements were taken with a 25 dBm signal input to the direct connect exciter 16. For wireless applications, when the direct connect exciter 16 is compared with the disc-cone exciter 32 performance of FIG. 12 the trade in simplicity for reduced performance is evident.

Figure 18:
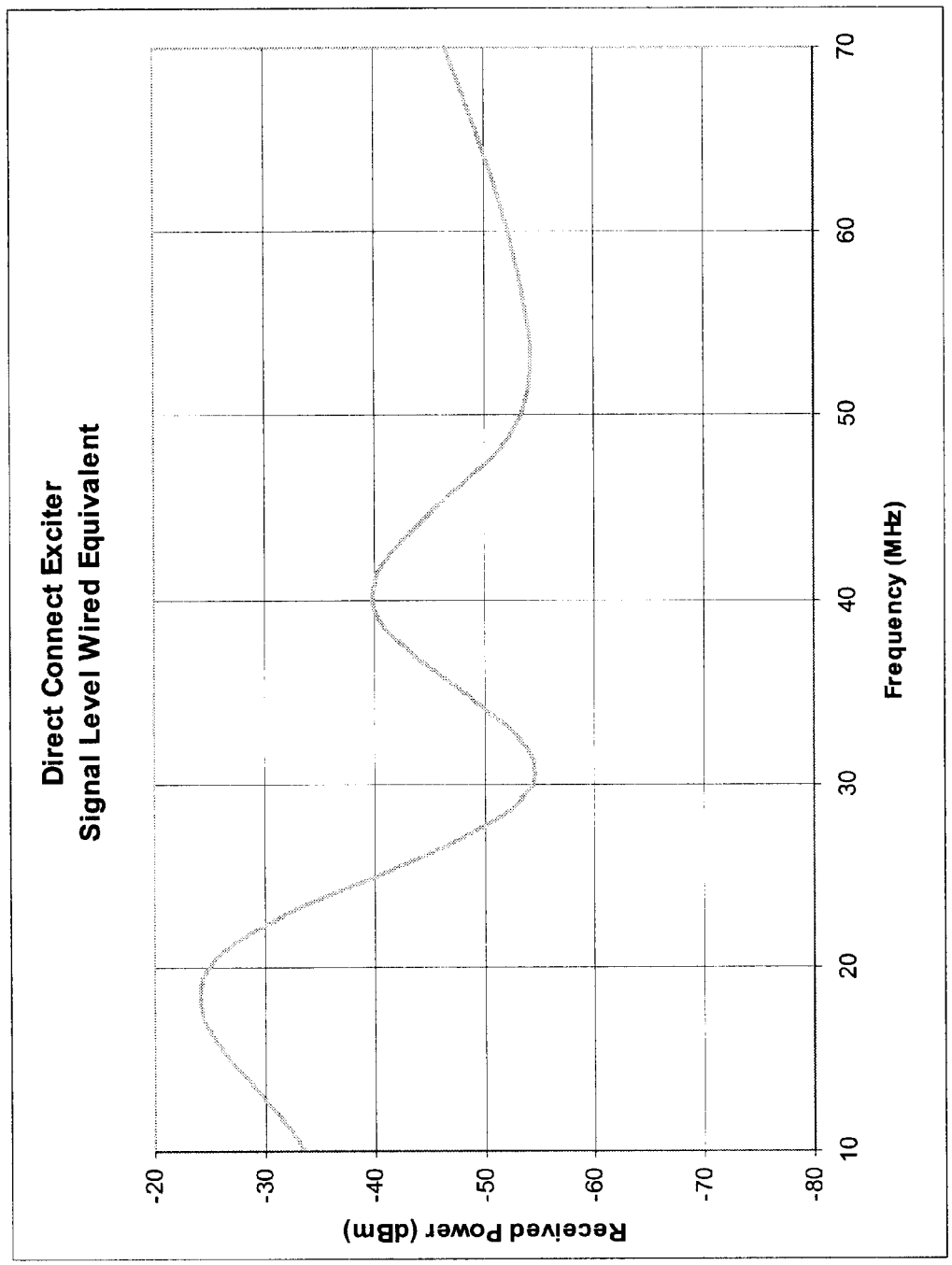
FIG. 18 is a graph of measured results obtained in a vehicle with the direct connect exciter of FIG. 14 installed and operational in wired equivalent communication mode.

FIG. 18 shows measured data for a wired equivalent communications link in a passenger vehicle with the direct connect exciter 16 of FIG. 15 installed in the trunk and a second direct connect exciter 16 located on a metallic structure within the passenger compartment. These measurements were taken with a 25 dBm signal input to the direct connect exciter 16. These measurements indicate the excellent performance of direct connect exciters operating in the wired equivalent mode of communications.

The present embodiment is only one of many other forms of direct connect exciter implementations possible. Other matching network 46 concepts have been implemented including transformer matching circuits. The connection between the matching network 46 and the metallic structure 22 may similarly take many forms, the simplest of which is a fastener to take the place of the terminal post 64 in which the fastener anchors the direct connect exciter 16 to the metallic framework 22 and also provides the path for the RF current 24 between the matching network 46 and the metallic framework 22.

For the wireless mode of communications, in FIG. 1 the transmitter within the communications equipment 20 provides energy within the desired frequency range in order to activate the exciter. The exciter 14, 16 then energizes the conductive framework 22 as described in the earlier application so that the modulated signals generated by the communication equipment 20 may be transmitted. The currents 24 in the structure create electromagnetic fields 26 in the compartments and near the surface of the vehicle. These electromagnetic fields 26 are then received by any of a number of wireless remote units 12, which consist of communication equipment 20 and a probe 18, situated within or near the vehicle. In addition, in a two-way or networked communications application, the exciter 14, 16 acts to receive and conduct signals generated by the wireless remote unit 12 to a receive system in the communications equipment 20 at the exciter 14, 16. Both transmission and reception may occur simultaneously between the exciter unit 10 and wireless remote units 12.

FIGS. 3A and 3B illustrate one-way wireless communications between an exciter unit 10 and a wireless remote unit 12 within or very near the vehicle. Likewise, FIGS. 4 and 5 illustrate two-way and networked wireless communications respectively between exciter unit 10 and wireless remote units 12 within or very near the vehicle. Signals generated by the communications equipment 20 at the exciter unit 10 and transmitted through the exciter 14, 16 may be at different frequencies than the signals generated by the wireless remote units 12 and carried back through the conductive framework 22 to the exciter 14, 16, and thence to the exciter communications equipment 20. An alternative embodiment is for signals generated by the communications equipment 20, exciter 14, 16 and wireless remote units 12 to operate at the same frequency by time sharing transmissions.

For the wired equivalent mode of communications, in FIG. 6 the transmitter within the communications equipment 20 provides energy within the desired frequency range in order to activate the exciter. The exciter 14, 16 then creates currents 24 in the conductive framework 22 so that the modulated signals generated by the communication equipment 20 may be transmitted. The currents 24 in the structure may be received at any point on the metallic structure of the vehicle with one or more exciter units 10. Both transmission and reception may occur simultaneously between exciter units 10.

FIGS. 7A and 7B illustrate one-way wired equivalent communications between exciter units 10 located at any points on the metallic surface of a vehicle. Likewise, FIGS. 8 and 9 illustrate two-way and networked wired equivalent communications respectively between points located on the metallic surface of a vehicle. Signals generated by the communications equipment 20 and transmitted through an exciter 14, 16 may be at different frequencies than the signals generated at other exciters 14, 16 at remote locations thereby allowing simultaneous wired equivalent communications between exciters. An alternative embodiment is for signals generated by the communications equipment 20 and exciters 14, 16 to operate at the same frequency by time sharing transmissions.

Characteristics of vehicles will differ and each enclosed space requires some empirical adjustment in order to properly locate and mount the exciter. However, for most vehicles, the exciter embodiments described herein will be efficacious in energizing and creating the bubble effect. Implementations of the invention have successfully demonstrated the wireless operation of a network transmitting streaming video over data links operating at eleven megabits per second (11 Mbps) and the wired equivalent control of lights and readout of sensors in vehicles.

Within the parameters set forth, the precise physical shapes and dimensions of the exciters may be varied, and different materials may be utilized while still resulting in functional operations. The spacing between the exciter element and the conductive framework may be varied within acceptable ranges and the manner of delivering the energy to the exciter may be varied. Those skilled in the art will no doubt be able to develop related structures and utilizations without undue experimentation.

While various embodiments have been described above, it should be understood that they have been presented by way of example only, and not limitation. Thus, the breadth and scope of the invention should not be limited by any of the above described exemplary embodiments, but should be defined only in accordance with the following claims and their equivalents.

Industrial Applicability

The present exciter system 1, 2 is well suited for application in communications within and very near to vehicles. The invention may provide wireless or wired equivalent communications, particularly at frequencies in the range of 0.1 to 100 MHz and in some variants ranging to above 500 MHz.

For wireless communications, the invention employs an exciter that injects currents in the metallic structure of the vehicle and creates fields within and near the vehicle such that information can be communicated with one or more remote communications devices with probes. Information can also be communicated from the remote device to the exciter by coupling transmitted energy from the remote device probe to the metallic structure thereby creating RF currents in the metallic structure of the vehicle that can be received by the exciter. Both evanescent and electromagnetic fields may be used for wireless communications. An operating frequency may be selected to be below the cut-off frequency, and evanescent fields are then used. Or the operating frequency may be selected to be above the cut-off frequency, and electromagnetic fields are then used.

For wired equivalent communications, the invention exploits the basic exciter operation to inject currents in the metallic structure and these currents flow throughout the vehicle metallic structure. An exciter also has the property of receiving currents in the structure generated by other exciters in or on the vehicle. Two or more exciter systems may therefore communicate with each other at points on the vehicle by injecting in or receiving RF currents from the metallic structure.

As can now be appreciated, a common aspect of the invention is injecting currents into the metallic structure of the vehicle. These currents inherently produce fields. In wireless embodiments of the invention the fields are used, with the manner of that use depending upon selection of the operating frequency. In wired equivalent embodiments of the invention the currents are directly used.

The exciters of the invention can take many forms, two of which have particularly been described herein and termed an optimum exciter 14 and a direct connect exciter 16. The optimum exciter 14 injects and/or receives currents from the vehicle structure in a manner that enables broadband, efficient wireless communications performance from the lowest frequencies to the highest frequencies in the operating band of the invention. The direct connect exciter 16 is much simpler but with less efficient performance at low frequencies of the invention.

Either exciter 14, 16 may be used to establish wireless or wired equivalent vehicle communications. In conjunction with essentially conventional communications equipment, such as modems, transmitters, receivers and filters an exciter operating with one or more remote units with probes provides wireless vehicle communications. Similarly, in conjunction with such communications equipment, two or more exciters provide wired equivalent vehicle communications. One-way, two-way, or networked wireless or wired equivalent communications throughout the vehicle can be provided without the traditional wiring harnesses common to today's vehicles.

These wireless and wired equivalent communications capabilities are such that similar communication bandwidths, information rates and connectivity may be provided to any point within or on the vehicle metallic structure as can be obtained by installing wires between these points or communicating utilizing traditional wireless technologies in the 2.4 and 5 GHz frequency bands. However, this invention utilizes the metallic structure of the vehicle thereby distributing currents throughout the vehicle and creating electromagnetic fields in all vehicle compartments. The result is the possible elimination of vehicle signal wiring in the case of wired equivalent applications and the capability of a single wireless transmission reaching all vehicle compartments as well as the near proximity outside the vehicle without the use of repeaters or access points.

For the above, and other, reasons, it is expected that the exciter system 1, 2 of the present invention will have widespread industrial applicability. Therefore, it is expected that the commercial utility of the present invention will be extensive and long lasting.

What is claimed is:

1. A system for communicating information between a first location within a vehicle and a second location within or very near to the vehicle, wherein the vehicle has a conductive metallic structure defining one or more major compartments, the system comprising:

an exciter unit including a first communication equipment and an exciter device that is conductively connected to the metallic structure of the vehicle;

a remote unit including a second communication equipment having a probe that is not conductively connected to the metallic structure of the vehicle;

said first communication equipment suitable to accept the information at the first location and modulate a signal with the information, wherein said signal has a carrier frequency that is selected to be either below cut-off for evanescent electromagnetic fields or above cut-off for propagating electromagnetic fields;

said exciter device suitable to receive said signal from said first communication equipment and conductively inject said signal as a current into the metallic structure of the vehicle such that an electromagnetic field is produced;

said second communication equipment suitable to couplingly receive said electromagnetic field from the metallic structure of the vehicle via said probe, demodulate the information from said electromagnetic field, and provide the information at the second location;

said second communication equipment also suitable to accept the information at the second location, to modulate said electromagnetic field with the information, and to couplingly transmit said electromagnetic field into the metallic structure of the vehicle via said probe such that said current is generated there in;

said exciter device also suitable to conductively extract said signal as said current from the metallic structure of the vehicle and provide said signal to said first communication equipment; and said first communication equipment also suitable to demodulate the information from said signal and provide the information at the first location, thereby providing the ability to communicate the information between the first location and the second location in a wireless manner.

2. The system of claim 1, wherein said exciter device includes:

a cone-surface simulate formed of an arranged plurality of conductive wires;

a cone-base formed of a first conductive plate conductively connected to the metallic structure of the vehicle;

a conductive spiral resonator having a centrally located resonator-base formed of a second conductive plate, wherein said resonator-base is centrally and conductively connected to the vertex of said cone-surface; and a conductor suitable for delivering said current to the vertex of said cone-surface.

3. The system of claim 2, wherein:

said plurality of conductive wires includes four said conductive wires;

said first conductive plate and said second conductive plate are flat discs ranging from three to four inches in diameter;

said spiral resonator is planar and nominally twelve inches in diameter; and said exciter unit ranges from two to three inches in height.

4. The system of claim 1, wherein said exciter device includes:

a matching network for efficiently allowing a desired alternating component of said current to pass to the metallic structure of the vehicle; and a blocking capacitance for preventing any direct component of said current from passing to the metallic structure of the vehicle.

5. The system of claim 4, wherein said matching network includes a series connected inductance and a shunt connected shunt capacitance.

6. The system of claim 1, wherein the vehicle includes a plurality of the second locations and a like plurality of said remote units, thereby forming a network having the ability to communicate the information between said first location and any of said plurality of the second locations.

7. A system for communicating a information from a first location within a vehicle to a second location within or very near to the vehicle, wherein the vehicle has a conductive metallic structure defining one or more major compartments, the system comprising:

an exciter unit including a first communication equipment and an exciter device that is conductively connected to the metallic structure of the vehicle;

a remote unit including a second communication equipment having a probe that is not conductively connected to the metallic structure of the vehicle;

said first communication equipment suitable to accept the information at the first location and modulate a signal with the information, wherein said signal has a carrier frequency that is selected to be either below cut-off for evanescent electromagnetic fields or above cut-off for propagating electromagnetic fields;

said exciter device suitable to receive said signal from said first communication equipment and conductively inject said signal as a current into the metallic structure of the vehicle such that an electromagnetic field is produced; and said second communication equipment suitable to couplingly receive said electromagnetic field from the metallic structure of the vehicle via said probe, demodulate the information from said electromagnetic field, and provide the information at the second location, thereby providing the ability to communicate the information from said first location to said second location in a wireless manner.

8. A system for communicating information from a first location within or very near to a vehicle to a second location within the vehicle, wherein the vehicle has a conductive metallic structure defining one or more major compartments, the system comprising:

a remote unit including a first communication equipment having a probe that is not conductively connected to the metallic structure of the vehicle;

an exciter unit including a second communication equipment and an exciter device that is conductively connected to the metallic structure of the vehicle;

said first communication equipment suitable to accept the information at the first location, to modulate an electromagnetic field with the information, and to couplingly transmit said electromagnetic field into the metallic structure of the vehicle via said probe such that a current is generated there in, wherein said electromagnetic field has a carrier frequency that is selected to be either below cut-off for evanescent electromagnetic fields or above cut-off for propagating electromagnetic fields;

said exciter device suitable to conductively extract said current from the metallic structure of the vehicle and obtain a signal from said current; and said second communication equipment suitable to receive said signal from said exciter device, demodulate the information from said signal, and provide the information at the second location, thereby providing the ability to communicate the information from said first location to said second location in a wireless manner.

9. A system for communicating information between at least two locations within a vehicle, wherein the vehicle has a conductive metallic structure defining one or more major compartments, the system comprising:

a plurality of exciter units equaling the number of the locations and each including a communication equipment and an exciter device that is conductively connected to the metallic structure of the vehicle;

said communication equipment each suitable to accept the information at its respective location and modulate a signal with the information, wherein said signal alternates at a radio frequency;

said exciter devices each suitable to receive said signal from its respective said communication equipment and conductively inject said signal as a current into the metallic structure of the vehicle;

said exciter devices each also suitable to conductively extract said current from the metallic structure of the vehicle, obtain said signal from said current, and provide said signal to its respective said communication equipment; and said communication equipment each also suitable to demodulate the information from said signal and provide the information at its respective location, thereby providing the ability to communicate the information between said locations in a wired equivalent manner.

10. The system of claim 9, wherein said exciter devices include:

a cone-surface simulate formed of an arranged plurality of conductive wires;

a cone-base formed of a first conductive plate conductively connected to the metallic structure of the vehicle;

a conductive spiral resonator having a centrally located resonator-base formed of a second conductive plate, wherein said resonator-base is centrally and conductively connected to the vertex of said cone-surface; and a conductor suitable for delivering said current to the vertex of said cone-surface.

11. The system of claim 10, wherein:

said plurality of conductive wires includes four said conductive wires;

said first conductive plate and said second conductive plate are flat discs ranging from three to four inches in diameter;

said spiral resonator is planar and nominally twelve inches in diameter; and said exciter unit ranges from two to three inches in height.

12. The system of claim 9, wherein said exciter devices include:

a matching network for efficiently allowing a desired alternating component of said current to pass to the metallic structure of the vehicle; and a blocking capacitance for preventing any direct component of said current from passing to the metallic structure of the vehicle.

13. The system of claim 12, wherein said matching network includes a series connected inductance and a shunt connected shunt capacitance.

14. The system of claim 9, wherein the vehicle includes a plurality of the locations exceeding two in number and a like plurality of said exciter units, thereby forming a network having the ability to communicate the information between said plurality of the locations.

15. A system for communicating a information from a first location to a second location within a vehicle, wherein the vehicle has a conductive metallic structure defining one or more major compartments, the system comprising:

a first exciter unit at the first location and including a first communication equipment and a first exciter device that is conductively connected to the metallic structure of the vehicle;

a second exciter unit at the second location and including a second communication equipment and a second exciter device that is conductively connected to the metallic structure of the vehicle;

said first communication equipment suitable to accept the information and modulate a signal with the information, wherein said signal alternates at a radio frequency;

said first exciter device suitable to receive said signal from said first communication equipment and inject said signal as a current into the metallic structure of the vehicle;

said second exciter device suitable to extract said current from the metallic structure of the vehicle and obtain said signal from said current; and said second said communication equipment suitable to receive said signal from said second exciter device, demodulate the information from said signal, and provide the information at the second location, thereby providing the ability to communicate the information between said first location and said second location in a wired equivalent manner.

16. A method for communicating information from a first location within a vehicle to a second location within or very near to the vehicle, wherein the vehicle has a conductive metallic structure defining one or more major compartments, the method comprising the steps of:

(a) accepting the information at the first location;

(b) modulating a signal with the information, wherein said signal has a carrier frequency that is selected to be either below cut-off for evanescent electromagnetic fields or above cut-off for propagating electromagnetic fields;

(c) conductively injecting said signal as a current into the metallic structure of the vehicle such that an electromagnetic field is produced;

(d) couplingly receiving said electromagnetic field from the metallic structure of the vehicle;

(e) demodulating the information from said electromagnetic field; and (f) providing the information at the second location, thereby providing the ability to communicate the information from said first location to said second location in a wireless manner.

17. The method of claim 16, wherein a plurality of the second locations are present, and wherein said step (f) includes providing the information to a designated one of said plurality of the second locations, thereby providing the ability to communicate the information within a network of the first location and said plurality of the second locations.

18. A method for communicating information from a first location within a vehicle to a second location within or very near to the vehicle, wherein the vehicle has a conductive metallic structure defining one or more major compartments, the method comprising the steps of:

(a) accepting the information at the first location;

(b) modulating an electromagnetic field with the information, wherein said electromagnetic field has a carrier frequency that is selected to be either below cut-off for evanescent electromagnetic fields or above cut-off for propagating electromagnetic fields;

(c) couplingly transmitting said electromagnetic field to the metallic structure of the vehicle such that a current is produced therein;

(d) conductively extracting said current from the metallic structure of the vehicle and obtain a signal from said current;

(e) demodulating the information from said signal; and (f) providing the information at the second location, thereby providing the ability to communicate the information from said first location to said second location in a wireless manner.

19. A method for communicating information from a first location to a second location within a vehicle, wherein the vehicle has a conductive metallic structure defining one or more major compartments, the method comprising the steps of:

(a) accepting the information at the first location;

(b) modulating a signal with the information, wherein said signal has a carrier frequency that is selected to be either below cut-off for evanescent electromagnetic fields or above cut-off for propagating electromagnetic fields;

(c) conductively injecting said signal as a current into the metallic structure of the vehicle;

(d) conductively extracting said current from the metallic structure of the vehicle and obtaining said signal from said current;

(e) demodulating the information from said signal; and (f) providing the information at the second location, thereby providing the ability to communicate the information from said first location to said second location in a wired equivalent manner.

20. The method of claim 19, wherein a plurality of the second locations are present, and wherein said step (f) includes providing the information to a designated one of said plurality of the second locations, thereby providing the ability to communicate the information within a network of the first location and said plurality of the second locations.

* * * * *